(12) United States Patent  (10) Patent No.: US 7,799,231 B2
Irvine  (45) Date of Patent: Sep. 21, 2010

(54) PROCESS FOR SEPARATING SOLIDS FROM LIQUIDS

(75) Inventor: William O. Irvine, Lakewood, CO (US)

(73) Assignee: Engineering Fluid Solutions, LLC, Arvada, CO (US)

( * ) Notice: Subject to any disclaimer, the term of this patent is extended or adjusted under 35 U.S.C. 154(b) by 0 days.

(21) Appl. No.: 12/192,680

(22) Filed: Aug. 15, 2008

(65) Prior Publication Data

US 2008/0308501 A1    Dec. 18, 2008

Related U.S. Application Data

(60) Division of application No. 11/624,790, filed on Jan. 19, 2007, now Pat. No. 7,455,784, which is a continuation of application No. 11/291,049, filed on Nov. 29, 2005, now Pat. No. 7,303,672.

(51) Int. Cl.
C02F 1/48 (2006.01)

(52) U.S. Cl. ..................... 210/695; 210/791; 210/805; 210/806

(58) Field of Classification Search ................ 210/695, 210/791, 805, 806
See application file for complete search history.

(56) References Cited

U.S. PATENT DOCUMENTS

| | | | |
|---|---|---|---|
| 2,663,427 A | 12/1953 | Riedel | |
| 3,982,499 A * | 9/1976 | Frankl | ............... 119/450 |
| 4,176,065 A | 11/1979 | Cook | |
| 4,217,207 A | 8/1980 | Liller | |
| 4,268,382 A | 5/1981 | Hanke et al. | |
| 4,462,907 A | 7/1984 | Waldecker | |
| 4,485,012 A | 11/1984 | Ehresmann | |
| 4,592,275 A | 6/1986 | Frankl | |
| 4,849,116 A | 7/1989 | Weinmann et al. | |
| 4,895,647 A | 1/1990 | Uchiyama | |
| 4,961,864 A | 10/1990 | Bruke | |
| 5,160,444 A | 11/1992 | McFarland | |
| 5,167,839 A | 12/1992 | Widmer, II et al. | |
| 5,340,472 A | 8/1994 | Heck | |
| 5,417,851 A | 5/1995 | Yee | |
| 5,587,067 A | 12/1996 | Love | |
| 5,674,386 A | 10/1997 | Filion | |
| 5,992,642 A | 11/1999 | Ota | |
| 6,063,296 A | 5/2000 | Ackerman et al. | |
| 6,368,500 B1 | 4/2002 | Asa et al. | |
| 6,428,697 B1 | 8/2002 | Edgar | |
| 6,986,849 B2 | 1/2006 | Irvine | |
| 7,303,672 B2 | 12/2007 | Irvine | |
| 2007/0114188 A1 | 5/2007 | Irvine | |

FOREIGN PATENT DOCUMENTS

JP    2000-213010    8/2000

* cited by examiner

*Primary Examiner*—Matthew O Savage
(74) *Attorney, Agent, or Firm*—Sheridan Ross PC (57) ABSTRACT

A liquid/solid separator system mounted on a mobile cart and connected to a process tank for reducing the rate at which fluids are consumed in manufacturing processes. The system may include automation and also may include a shear-stepped screen including tilted wire wedge wires arranged at varying cant angles. The system may include a fine screen basket received in a settling box.

6 Claims, 11 Drawing Sheets

PROCESS FOR SEPARATING SOLIDS FROM LIQUIDS

CROSS-REFERENCE TO RELATED APPLICATIONS

Priority is claimed from U.S. Divisional application Ser. No. 11/624,790 filed Jan. 19, 2007, now U.S. Pat. No. 7,455,784, which claims priority from U.S. Continuation application Ser. No. 11/291,049 filed on Nov. 29, 2005, now U.S. Pat. No. 7,303,672, which claims priority from U.S. application Ser. No. 10/412,899 filed on Apr. 14, 2003, now U.S. Pat. No. 6,986,849, each of which are incorporated herein by reference in their entireties.

FIELD OF THE INVENTION

This invention relates to a liquid/solid separator and method or process.

BACKGROUND OF THE INVENTION

Many industries consume large volumes of fluids (predominately water), chemical additives and reagents in manufacturing products. The fluids are used primarily in rinsing, cooling and treatment operations to achieve desired product quality and cleanliness. In industry, manufactured products are often immersion rinsed and/or sprayed several times along an assembly line via immersion tanks and/or high-pressure spray washer conveyors. Excess solid debris loosely adhering to newly manufactured or remanufactured products is washed off in rinsing/spraying processes and accumulates in short order in reservoirs of immersion and spray waters, which degrades the cleansing ability of the fluid, leaving it ineffective in achieving desired product quality. Depending on the manufacturing process, the entire volume (typically between 400 to 2000 gal.) of fluid in an immersion tank or recirculant spray washer conveyor may be discharged daily to waste and refreshed with new fluid and chemical additive to restore effective cleansing ability. A significant cost burden is associated with up-front purchasing, inventorying and administration in re-supplying fresh fluids and additives, which is furthered in properly treating (physically, chemically & biologically) used fluids before discharging to the environment for natural recycling. Therefore, both business and environmental perspectives share a common desire, which is to significantly reduce the rate at which fluids are consumed in manufacturing processes.

At present, conventional approaches to solving and/or mitigating the aforementioned problem are fraught with inefficiencies that include: 1) high initial capital equipment cost; 2) difficulty in installation and mobilization of equipment; 3) difficulty in understanding and controlling operation; 4) requirements for formal training to operate and maintain; 5) difficulty in to troubleshooting; 6) high frequency wear parts and many moving parts; 7) requirements for specialty tools in operating and maintaining; 8) large, heavy and extensive (large footprint); 9) high incremental cost in replacing consumable filtration media; 10) strict physical property requirements of accumulating solids in specific gravity, size, shape, consistency and character; 11) high associated maintenance time and cost; 12) pressure- and flow-sensitive; 13) limited scope by relying largely on a single principal of operation; 14) low efficiency; 15) undesirable interruption of main process when maintaining; 16) frequent and voluminous discharge and flush volumes required during automatic cleaning cycles; 17) largely non-automatic in cleaning internal elements; 18) high associated energy cost; 19) difficulty in accessing and maintaining internal elements; 20) frequent malfunction; 21) frequent obstruction of critical elements; 22) auxiliary power requirements and controls in initiating auto-cleaning modes; 23) sharing of filtration equipment between reservoir tanks is prohibitive due to conventional design mindset around a necessarily permanent configuration; 24) filtration equipment typically does not come fully packaged, requiring integration of ancillary equipment, controls and instrumentation; 25) replacement of internal elements in determining ideal media pore sizes is expensive and time-consuming; 26) units are easily tampered with; 27) high shipping and handling costs on weight and volume basis; 28) degree of influence in removing solids from fluids is not appreciable (rate of fluid contamination is appreciably greater than rate of solids removal); 29) disassembly is time-consuming, difficult and potentially unsafe; 30) low return on investment translating into long payback periods; 31) operational results selfishly favoring either business perspective or environmental perspective; and 32) that problem is not truly solved, rather, it is transferred.

SUMMARY OF THE INVENTION

One embodiment of the invention involves a unique design that significantly reduces the consumption rate of fluids used in industrial processes while largely optimizing, balancing and mitigating the aforementioned operational- and maintenance-related efficiencies. The design integrates four (4) distinct separation elements that are optimally arranged to achieve desired results:

I. Coanda Tilted Wire Wedge-wire Coarse Screen (Primary Separation Element)
II. Woven-wire Mesh Fine Screen (Secondary Separation Element)
III. Settling Box (Tertiary Separation Element)
IV. Magnets (Quaternary Separation Element)

Another embodiment of the invention is a liquid/solid separator system including a first screen arranged at an angle to the horizontal and having an upper end and a lower end. There is also provided a first line for moving a solid-containing fluid above the upper end of said screen to cause the solid-containing fluid to move down and across the screen under the influence of gravity. A settling box is positioned below the lower end of the first screen. A strainer basket is received within the settling box in spaced relation to the settling box.

Still another embodiment of the invention is a process for separating solids from liquids which involves providing a process tank which contains a solid-containing liquid. A first filter screen is provided arranged at an angle to the horizontal and having an upper end and a lower end. An active return line is positioned below the first screen to receive a liquid which flows through the screen and returns it to the process tank. A discharge chute is provided at the lower end of the first filter screen for receiving and conveying liquid and solids that do not pass through the first screen. A second filter screen which is finer in pore size than the first filter screen is provided and receives the liquid and solids exiting from the discharge chute. A settling box is provided, receiving the second filter screen. The solid-containing liquid flows from the process tank to the first filter screen to separate solids from the solid-containing liquid and then the flow through the active return line is shut off to rinse the first filter screen and cause solids thereon to pass into the discharge chute.

Another embodiment of the invention is a filter screen for separating solids and liquids which includes a series of wires and a series of ribs having the wires fixed thereto in a pattern wherein the wires are parallel to each other. Each wire of the series of wires has a cross section which is a triangle with two sides of the triangle forming a vertex which is the point at which the wire is fixed to the ribs. The remaining side of the triangle is tilted at an angle to the ribs. The screen has an upper end and also a lower end and the tilt angle is greater for the wires at the upper end than it is for the wires at the lower end.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Figure 2:
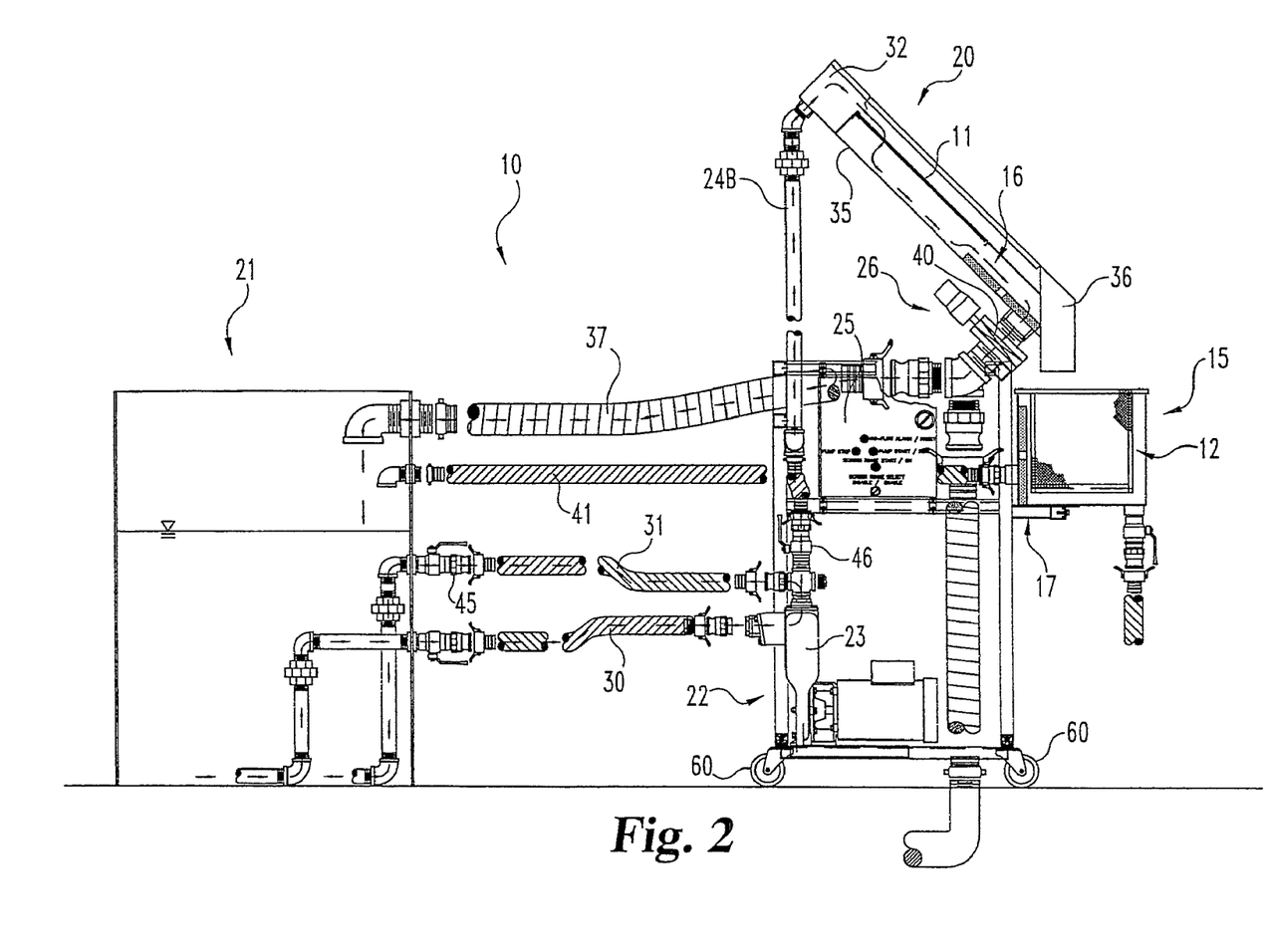
FIG. 2 is a side elevation view of the liquid solid separator of the present invention showing it in normal operation mode.

Referring to the drawings and particularly to FIG. 2, there is illustrated an apparatus 10 that includes four separation elements. The primary separation element is a tilted wire wedge-wire coarse screen 11. The secondary separation element is a woven wire mesh fine screen 12. The tertiary separation element is a settling box 15 and the quaternary separation element is magnets 16 and 17. These four elements operate in four modes of operation: 1) normal operation mode, 2) screen rinse mode, 3) maintenance mode and 4) tank refresh mode.

The apparatus 10 includes seven major assemblies that are connected by appropriate hydraulic connections. Four of those major assemblies are the primary separation assembly 20 which includes the coarse screen 11, the secondary separation assembly which includes the fine screen 12 and the settling box 15, the tertiary separation assembly which is the sediment basin or process tank 21 and the quaternary separation assembly which includes the magnets 16 and 17. The remaining major assemblies are the recirculating pump assembly 22, the pump/screen rinse controller assembly 25 and the rinse valve assembly 26.

Figure 1:
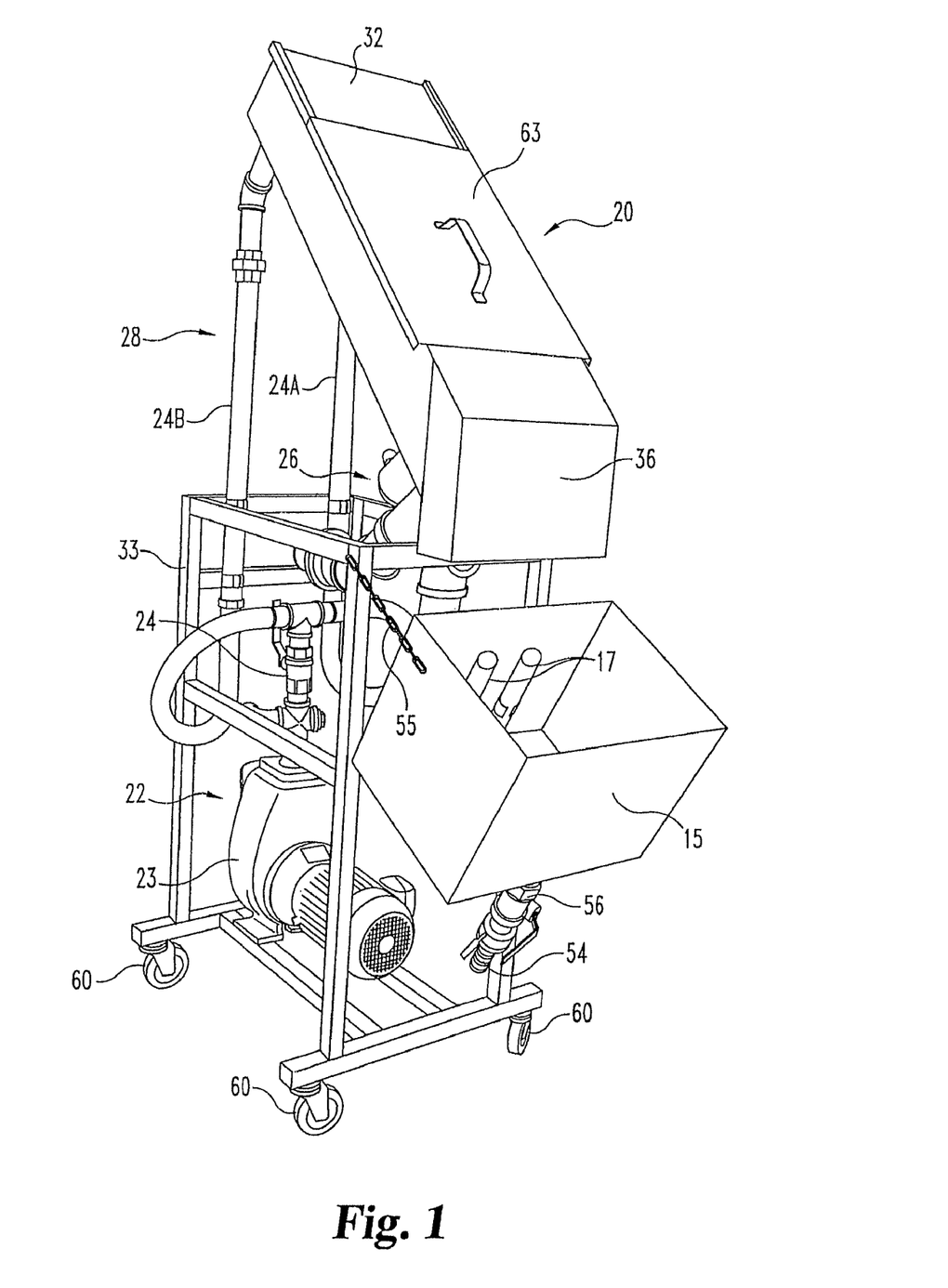
FIG. 1 is a perspective view of the liquid solid separator of the present invention with certain elements removed to show internal construction.
Figure 5:
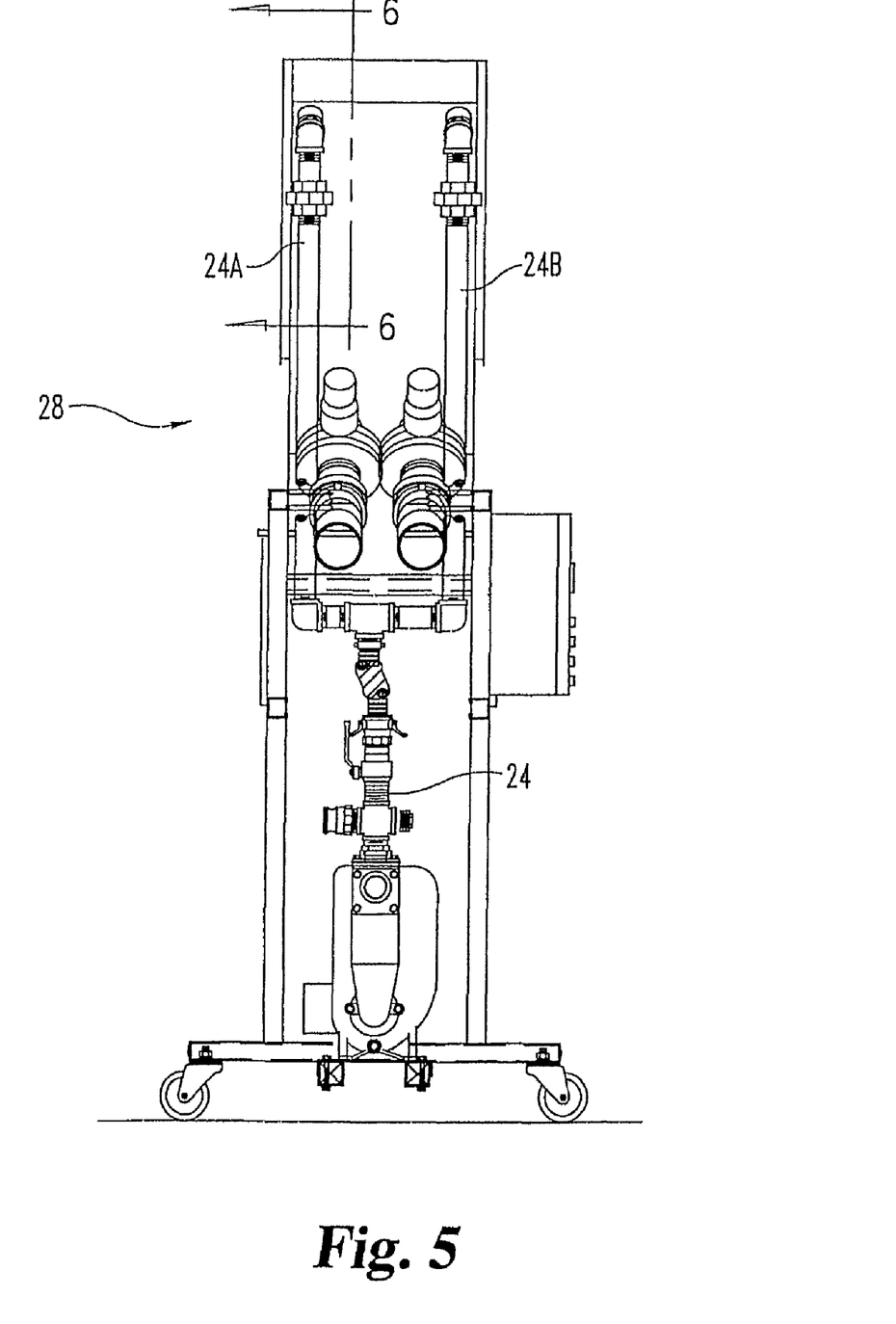
FIG. 5 is a rear elevation view.

The recirculating pump assembly 22 includes a self-priming trash pump 23 which is coupled to the process tank 21 through a pump suction line 30 and a sparger return line 31. Various kinds of pumps may be used in place of the trash pump 23 and some embodiments of the invention may not include any pump (i.e., where sufficient elevation head is supplied by a process stream). However, a trash pump 23 is preferred, particularly if the solids involved include relatively large items. In one preferred embodiment of the invention, the trash pump 23 is a product of MP Pump, Inc. of Tecumseh Products Company of Detroit, Mich. The trash pump 23 is also coupled by the pump discharge line 24 to the head compartment 32 of a separation pan 35 which houses the coarse screen 11. The pump discharge line splits into two lines, 24A and 24B, as shown in FIGS. 1 and 5. The lower end of the separation pan has mounted thereon a liquid/solid discharge chute 36. Also connected to the lower end of the separation pan is an active return line 37 which returns filtered fluid back to the process tank 21. The active return line is coupled to the separation pan at a location directly below the screen 11 and at a location where it receives liquid passing through the screen onto the separation pan 35. The discharge chute 36 on the other hand is located to the right of (as viewed in FIG. 2) and downwardly of the inlet to the active return line.

Flow through the active return line 37 is controlled by a valve 40 which is part of the automated rinse/valve assembly 26 (alternatively, a manually operated valve may replace the automated valve assembly 26). A passive return line 41 is coupled to the settling box 15 and has its discharge end leading into the process tank 21. The connection of the settling box passive return line 41 to the settling box 15 is at an elevation above the bottom of the settling box so that fine solids passing through the wire mesh fine screen 12 are detained, allowing them to settle in the settling box 15 with only a relatively small amount of them being returned through the passive return line 41 to the process tank 21.

The process tank or sediment basin 21 will vary in size and configuration from application to application; however, the function of the pump suction line 30 and the sparger return line 31 are functionally the same in those applications. Inlets to the suction line 30 are located at spaced locations on the bottom of the process tank 21. Similarly, the sparger return line 31 has a number of outlets on the bottom of the process tank at spaced locations spaced away from the inlets of the suction line.

Figure 9:
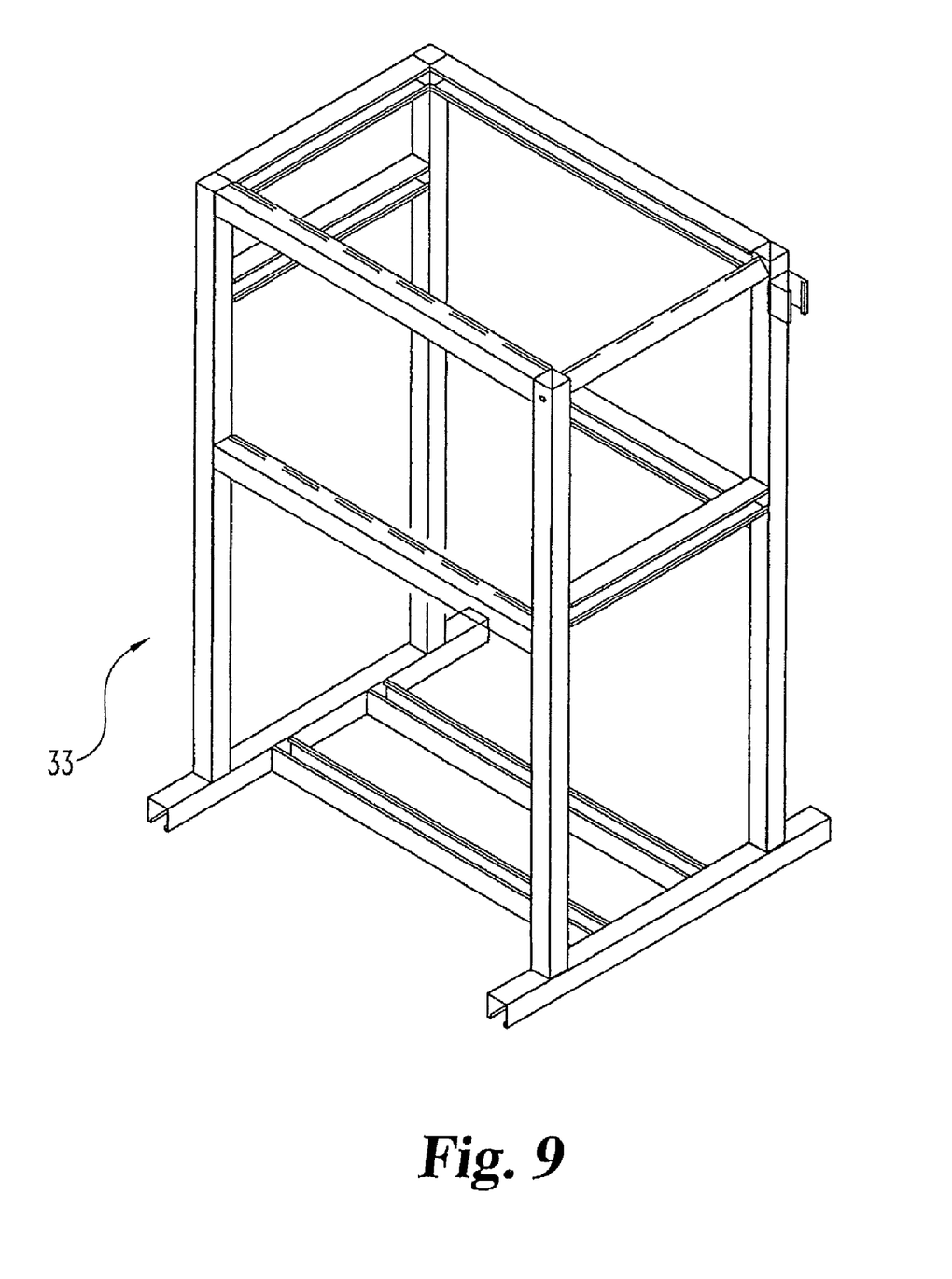
FIG. 9 is a perspective view of a stand/cart upon which the elements of the separator are mounted.

Perspective view FIG. 1 shows the apparatus 10 in a condition unconnected to the process tank 21. The apparatus 10 is mobile and is provided with casters 60 so that it can be easily relocated and hydraulically connected to different process tanks 21. Alternatively, the apparatus 10 may be provided without casters and mounted securely at the stand base. FIG. 9 is a perspective view of the cart 33 or stand upon which the elements of the apparatus are mounted.

Figure 6:
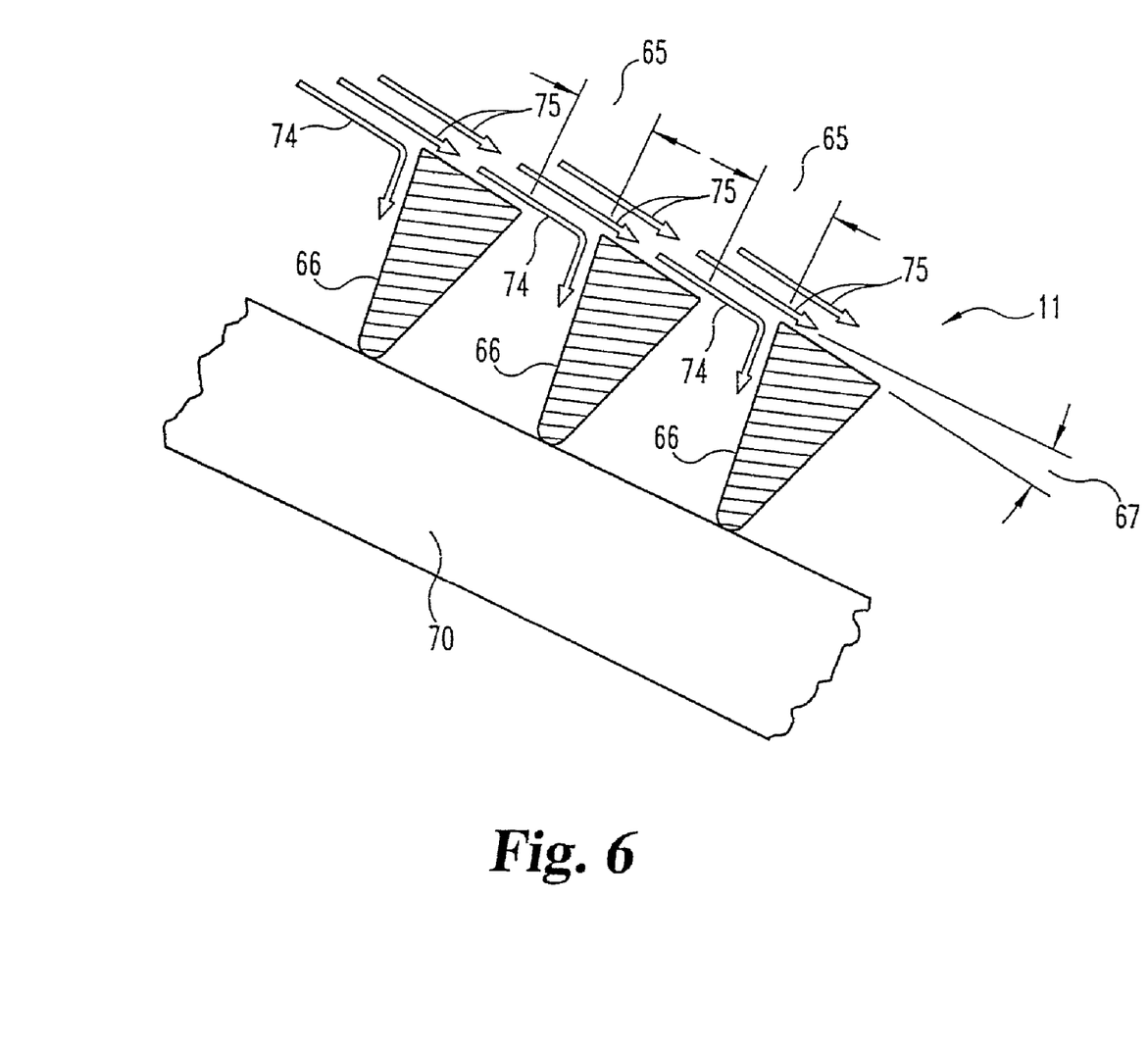
FIG. 6 is a fragmentary enlarged section of the coarse filter screen taken along line 6-6 of FIG. 5.
Figure 7:
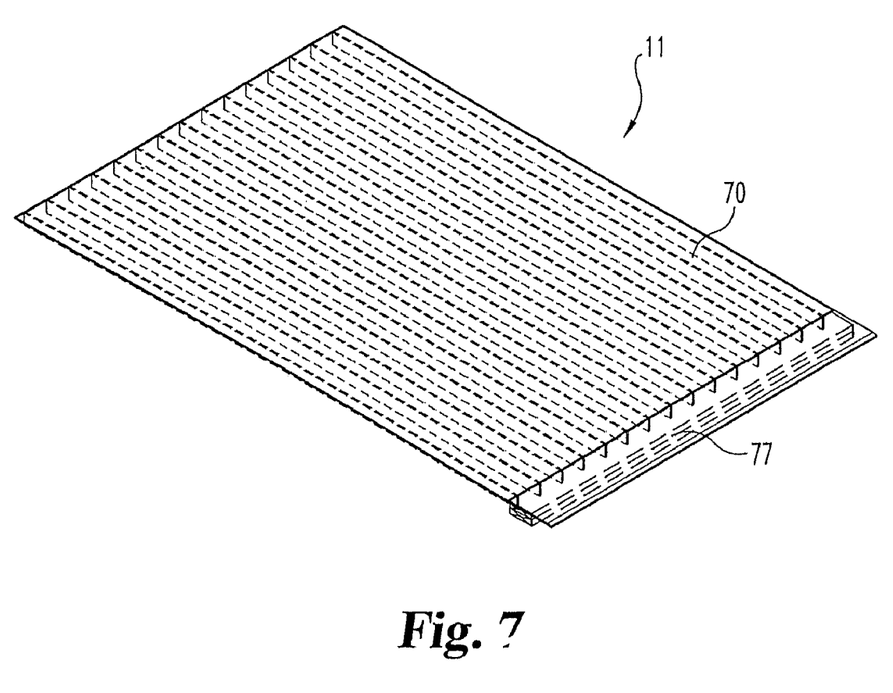
FIG. 7 is a perspective view of the coarse filter screen looking at it from above.
Figure 10:
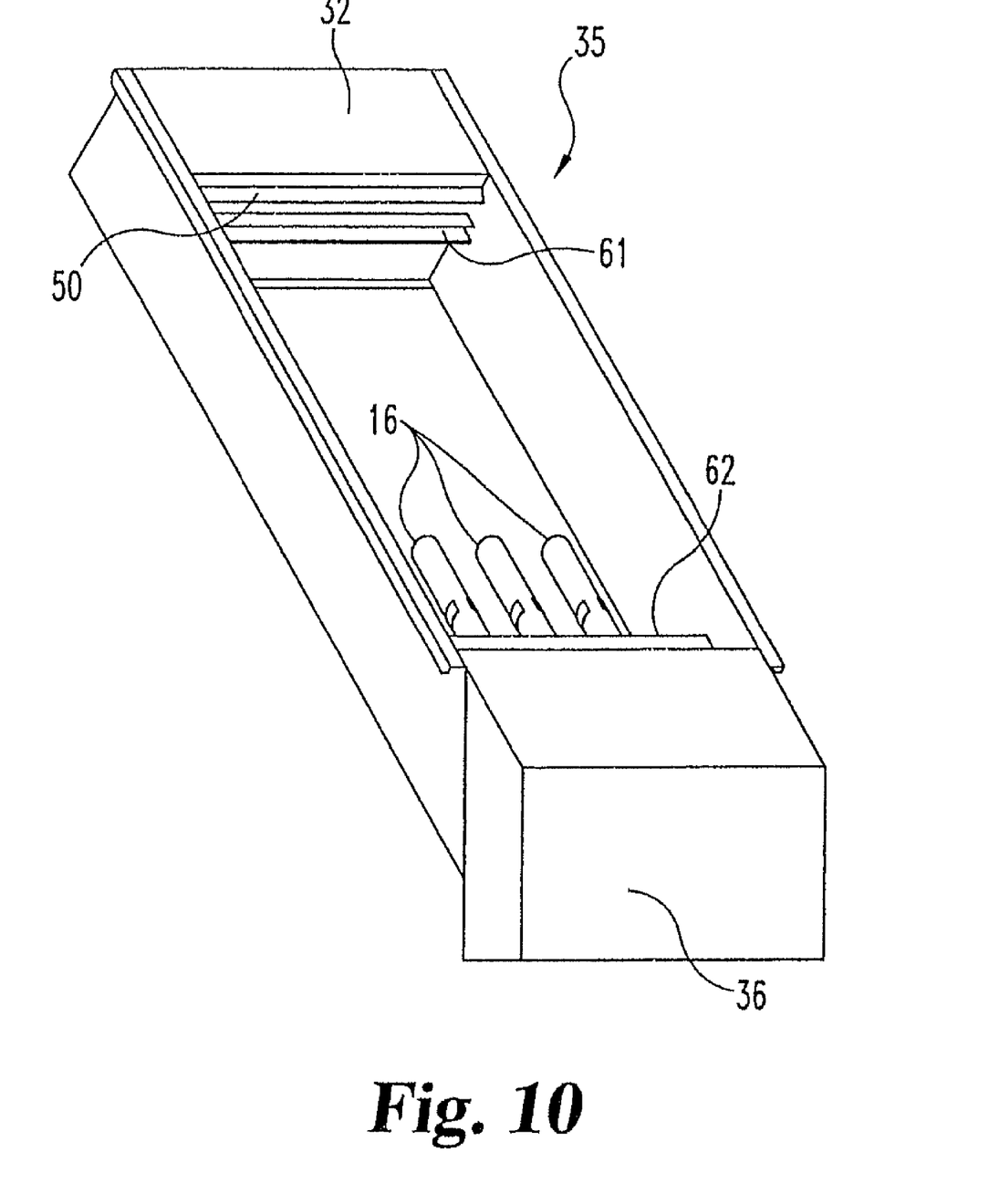
FIG. 10 is a perspective detail view of a separation pan forming a part of the separator.

Referring to FIGS. 6 and 7, the wedge wire coarse screen 11 is illustrated. FIG. 10 is a perspective detail view of the separation pan 35 within which the coarse screen 11 is mounted with the screen being supported on the upper screen support 61 and lower screen support 62. FIG. 1 shows a lid 63 for the separation pan 35 which prevents splashing to the outside of the apparatus. The coarse screen 11 is a commercially available item and may be obtained, for example, from Johnson Screens in New Brighton, Minn., specifying the wire size, spacing and cant. Referring to FIG. 6, the spacing dimension 65 is the distance between the individual wires 66 of the screen. The cant angle 67 is formed between the top plane of the wedge wires 66 and a plane parallel to the ribs 70 upon which the wires 66 are attached. As can be seen in FIG.

Figure 8:
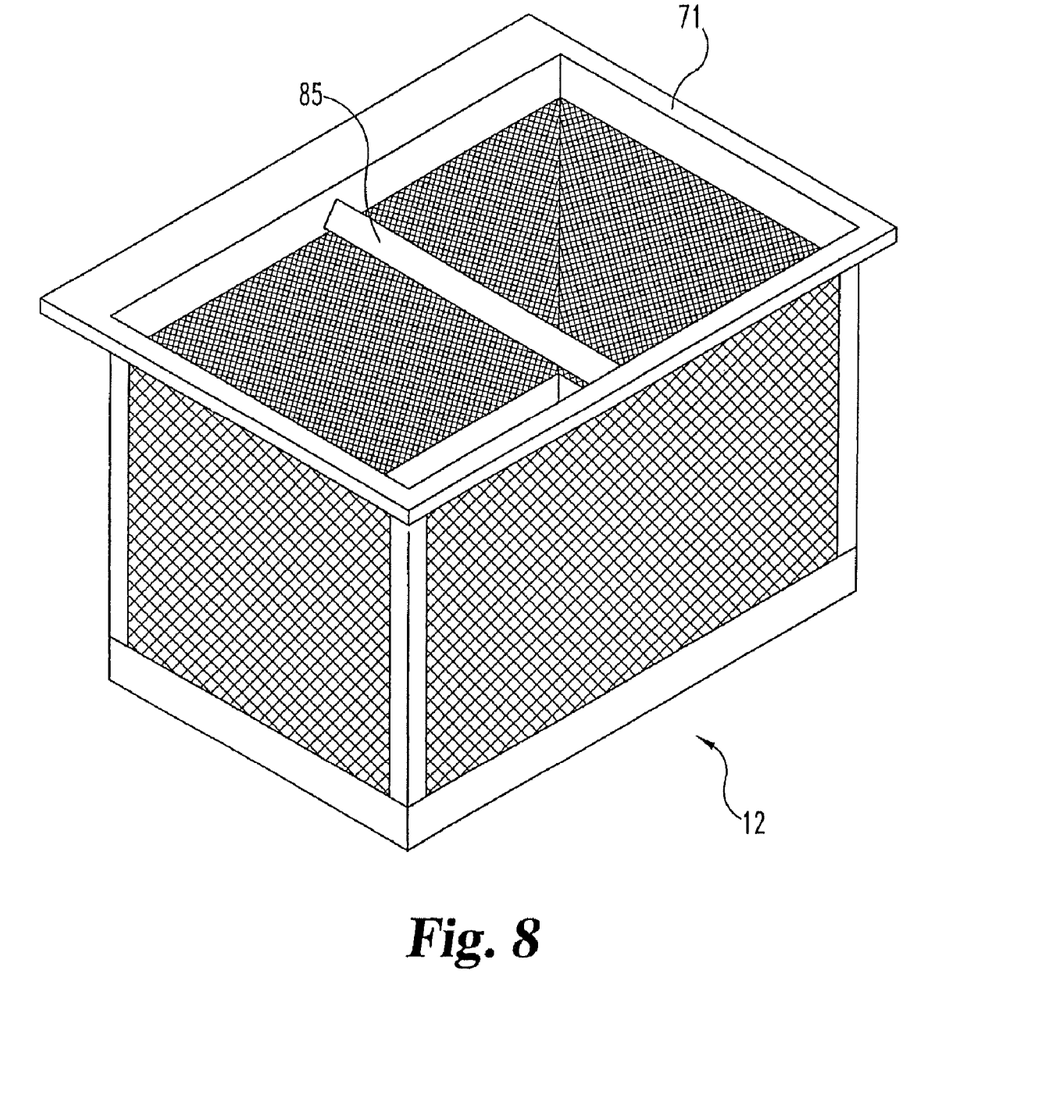
FIG. 8 is a perspective view of the fine filter screen.

6, the wires 66 have a triangular cross section (hence the term "wedge wire screen"). In a preferred embodiment of the invention, the dimension 65 for the coarse screen 11 is nominally 200 micron and the cant angle 67 is 5 degrees. In comparison, the fine screen 12 has a nominal dimension between its wires in the same preferred embodiment of 100 micron. FIG. 8 is a perspective view of the fine screen 12 which is received within settling box 15 and has a lip 71 allowing it to rest upon the top edge of settling box with the fine screen 12 in spaced relation to the inside of the settling box 15. The settling box 15 has a silt rinse line 54 controlled by a suitable valve 56.

As further shown in FIG. 5, an assembly which includes the pump discharge line 24, 24A and 24B is the pipe riser/support assembly 28 which has the dual function of supporting the separation pan 35 and conveying fluid to the head compartment 32 of the separation pan 35. Thus the portions of the pump discharge line 24, which are the pipes 24A and 24B, are rigid and fixed to the rigid cart or stand 33 as well as the head compartment 32 of the separation pan 35, thereby supporting the separation pan.

The apparatus functions in four (4) basic modes of operation: 1) Normal Operation Mode, 2) Screen Rinse Mode, 3) Maintenance Mode, and 4) Tank Refresh Mode.

During normal operation, process fluid and suspended solids are conducted from the process tank or sedimentation basin 21 via a custom-designed suction manifold. Hydraulic elevation head within the tank, along with assistance from the self-priming trash pump, provide the motive energy required to maintain fluid flow through the separator. On the discharge side of the pump, the fluid flow is split with one of the branches returning fluid directly back to the tank via the sparging return line 31 and the other directing the fluid through the vertically-oriented pipe riser/support assembly 24, 24A and 24B that feeds the head compartment 32 of the separation pan 35. The sparging line 31 directs relatively high-pressure fluid to the bottom of the process tank to continually stir and suspend settled solids for enhanced pick-up by the suction manifold. The pump also delivers fluid to the head compartment 32 of the separator pan 35. Upon filling the volume of the head compartment 32, the fluid then passes through a rectangular opening, and down across the coarse screen 11 under gravity.

Upon contacting the wedge wire screen 11, the contacting fluid is sheared away to the underside of the screen, leaving appreciable solid loading on top of the screen. In FIG. 6, arrows 74 represent the flow of fluid that is sheared away from the main flow represented by arrows 75. Fluid on the underside of the screen falls and travels down the bed of the separation pan 35 and passes across the quaternary separation element (magnet(s) 16). The magnets attract and hold essentially all fine ferromagnetic material that may have passed through the primary separation element (the magnets are an option). The fluid flows back to the process tank under gravity via the active return line 37 connected to the bottom underside of the separation pan. Continual operation in normal mode reduces solid content in the process fluid and resultantly leaves relatively large-sized solids accumulating on the top side of the wedge wire screen and finer ferromagnetic material on the magnet. Hence, primary and quaternary separation are achieved.

In time, accumulating solids on the top of the wedge wire screen will automatically propel down the face of the wedge wire screen 11 under the influence of gravity and eventually drop through the discharge chute and into the strainer basket 12. In some applications, accumulating debris on the wedge wire screen builds without readily releasing under the influence of gravity alone. The result is continual enlargement of the solids pile on the wedge wire screen until the solids begin interfering with the fluid being sheared near the upper portion of the wedge wire screen. The damming that manifests is often sufficient to continue automatically pushing solids slowly down the face of the screen. In applications where debris appreciably and undesirably "hangs up" on the wedge wire screen without being adequately released under gravity and damming, a simple rinse cycle may be initiated which removes virtually all loose solid debris from the wedge wire screen.

By way of adjustable timers within the pump/screen rinse controller 25, the rinse valve 40 in the active return line 37 automatically closes on a periodic basis for a short preset duration. In closing the valve, fluid flow is obstructed from returning to the process tank. Under this condition, with the pump continually feeding fluid to the separation pan, air beneath the wedge wire screen in the separation pan 35 becomes pressurized which severely limits fluid flow through the wedge wire screen; therefore, the fluid instead, flows down across the entire length of the screen, which vigorously and quickly rinses debris off the screen and into the strainer basket 12. Upon opening the rinse valve, fluid is again returned to the process tank and normal operation mode resumes. As a consequence of releasing both solids and liquid into the strainer basket 12 during a screen rinse cycle, secondary, tertiary and quaternary separation processes commence. In the strainer basket, the secondary separation element (fine woven-wire mesh screen) arrests large and moderately sized solids and passes fluid and small fines to the open annular space between the outside of the strainer basket and settling box. In the settling box, the fluid must elevate to the level of the outlet before passively returning fluid back to the process tank. The detention time inherent in the settling box permits fine settleable solids to accumulate in the bottom of the settling box. Virtually all fine suspended ferromagnetic material passively returning to the process tank are attracted to a magnet 17 within. The rate of fine filtration depends on the frequency of the screen rinse cycle. The frequency is adjusted to fall within the hydraulic capacity of the strainer basket and settling box.

By closing the rinse valve, the rinse is initiated because the coarse screen hydraulic capacity temporarily drops to near zero, so that flow through the separator is in excess of screen capacity. Essentially, the same condition may result by increasing supply flow for a short duration in excess of screen capacity, for example by increasing pump speed or adjustment of a throttling valve on the supply side of the coarse screen.

Figure 3:
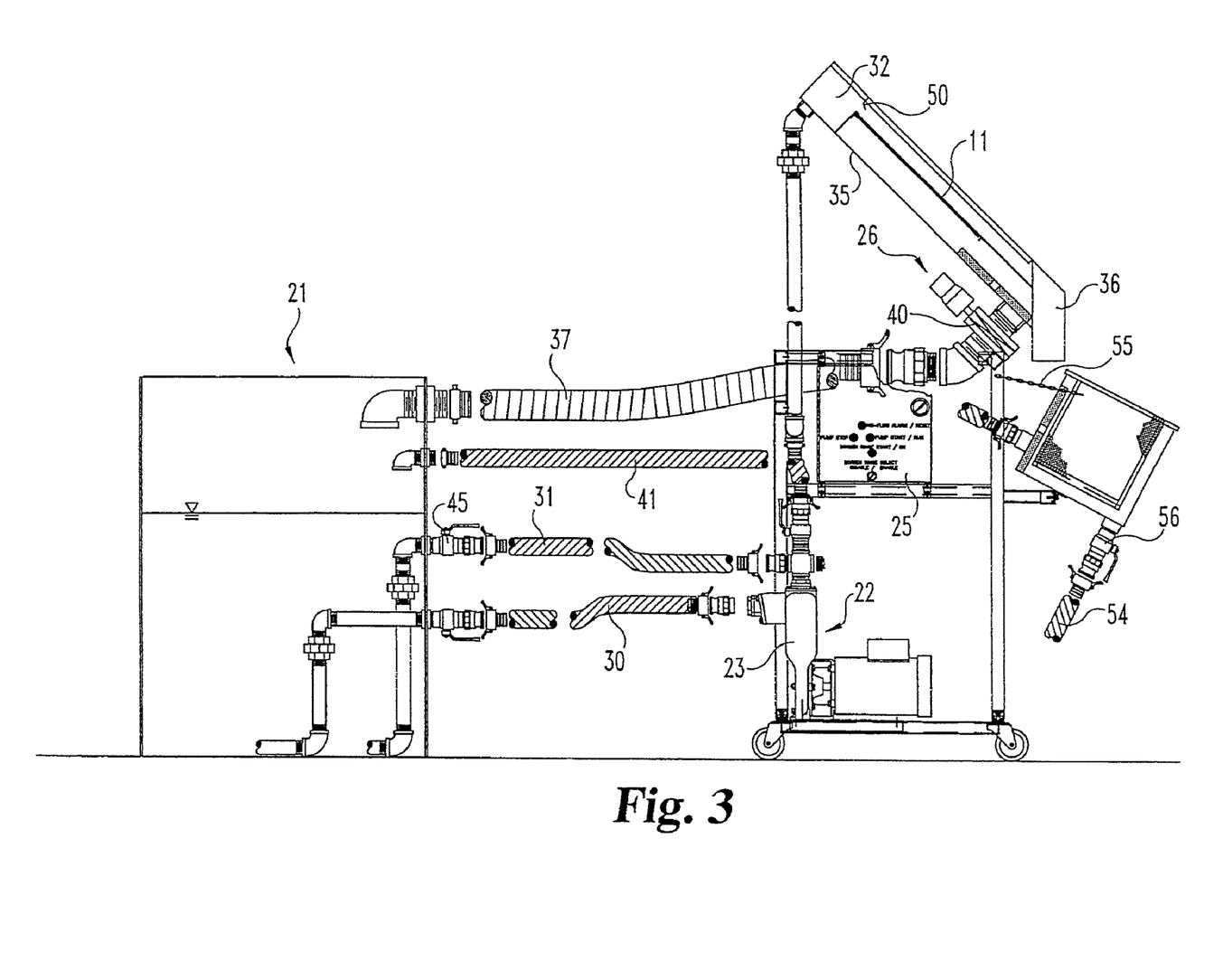
FIG. 3 is a view similar to FIG. 2 showing the separator in maintenance mode.
Figure 4:
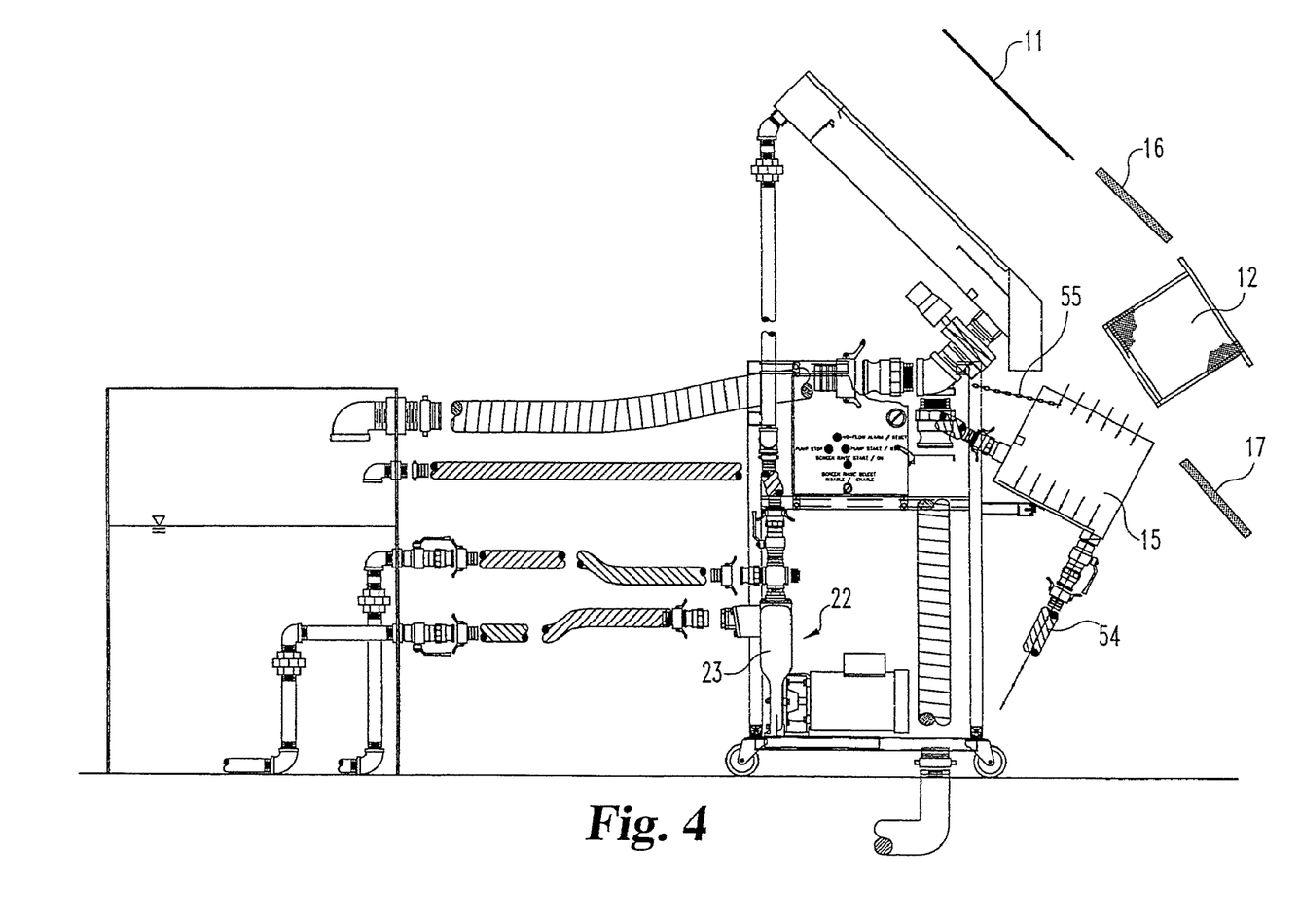
FIG. 4 is a view similar to FIGS. 2 and 3 showing the separator further disassembled in maintenance mode.

FIGS. 3 and 4 show some disassembled elements taken in the maintenance mode of the apparatus. Depending on the particular application, the fine screen 12 will become filled with solid material and need emptying. FIG. 4 particularly shows this mode of the process. Also shown in FIG. 4 are the magnets 16 and 17 removed from their mountings in the apparatus. Preferably, these magnets include non-magnetic end portions to facilitate removal of the ferromagnetic material from the magnets. In maintenance mode, the bottom of the settling box 15 may be cleaned of settled solids by flushing through the settling box drain line 54 and by appropriate manual tools.

Flat-bottomed tanks are inherently difficult to filter when solids within are moderately to highly settleable. The present invention addresses the challenge associated with attempting to filter industrial fluids within flat bottomed tanks where the solids characteristically do not concentrate, but rather, spread across the bottom surface of the tank and/or suspend within the process fluid.

To capture settleable and suspended solids, the suction manifold is provided with several hydraulic pick-ups located at spaced locations along the bottom of the tank. The piping network is designed with split-cut open pipe ends (not shown) and sweep fittings (not shown) for enhanced hydraulic efficiency. The suction manifold is easily assembled and disassembled with union fittings. Pipe sizes of the suction manifold are chosen to prevent pump cavitation. Pipe materials are selected to minimize corrosion and threaded connections are made only moderately tight and without sealant to ease assembly and disassembly. The suction manifold is arranged to avoid interference with existing equipment within the process tank. The suction manifold piping layout is determined in attempting to minimize the number of fittings. Depending on the application, all or most of the manifold may be pre-cut and assembled into a kit. Cam-lok fittings and heat resistant rubber hose are preferably used in the suction line 30 in interconnecting the tank to the suction port on the pump 23. Many applications use heated fluids that may approach boiling temperatures, so materials resistant to heat are imperative. Material selection of the cam-lok fittings is made based on cost and corrosion resistance. Hard piping may replace hose and cam-lok fittings. Cam-lok fittings and hose are chosen to ease installation and provide flexibility in moving the apparatus.

Process tank penetrations for all line interconnections are prefabricated from full couplings and mounting plates. The mounting plates assure a water-tight seal and enlarge the mounting area for stress-reduction. The standard pump 23 is a self-priming centrifugal trash pump. The self-priming feature allows the unit to work on tanks in which the suction head on the pump is low. A trash pump is preferable as relatively large infrequent objects are likely to pass without damaging the pump. A clean out port on the trash pump allows easy access to debris that may accumulate within the pump housing. The pump is selected with mounting feet that fit conveniently across closely spaced pump mount rails of the stand base 33 for maintaining a relatively small footprint. The pump drive motor is close coupled for compactness of design. The drive motor housing is finned for readily transferring heat and/or offset slightly through an extended shaft. The pump drive motor is oriented toward the inside of the stand for protection. Alternative pump seals are available having higher heat and chemical resistance. The pump drive motor is TEFC and oversized in hydraulic capacity to support the sparging manifold connected to the discharge of the pump. The check valve in the pump is removed to drain the riser/support assembly 24 whenever the pump shuts off.

Pressurized fluid flows through the sparger discharge line 31 to the process tank. The sparging manifold is fanned out to nozzles that spray and stir the bottom of the process tank; ultimately encouraging settled particles to the suction points on the suction manifold. A valve 45 on the sparger discharge line 31 is used to throttle sparger flow and balance discharge flow to the head compartment 32 of the separation pan 35. In the event debris obstructs the sparger line, the connections of the suction and sparger line at the pump or process tank may be briefly switched with the isolation valve on the original suction manifold closed which ultimately directs fluid backwards through the sparger line, dislodging the obstructing debris and shooting it vertically up through the pipe riser/support assembly to the head compartment 32 for ultimate release. The suction and sparger line sizes are selected to minimize obstruction. Once cleared, the suction and sparger lines are reconnected in their normal configuration with normal valve throttle settings re-established.

A thermal dispersion flow switch mounted to the pump discharge senses whether or not there is adequate flow through the pump. In the event adequate flow is not established in a preset time period, the pump will shut off and signal a visible alarm light on the face of the pump/screen rinse controller 25. Initial pump priming is easily established by removing the cam-lok fitting and pouring fluid down into the discharge port. Also, the process tank should be checked for fluid and the isolation valve should be in the full open position. After establishing prime and open connection to fluid within the process tank, the alarm light is pushed for resetting and the pump run button is pushed for restarting.

A throttle valve 46 in the pump discharge line 24 is adjusted to regulate flow to the head compartment 32 of the separation pan 35. The connection between the head compartment throttling valve 46 and the pipe riser/support assembly 28 is made with flexible hose and cam-lok fittings for relief in adjusting the horizontal and vertical position of the pipe riser/support assembly. As the name implies, the pipe riser/support assembly is dual purpose, offering structural column support of the separation pan and hydraulic conveyance of the liquid/solid mixture being separated by the apparatus. In the present design, the two vertical pipes 24A and 24B (because of their relatively small diameter to flow rate ratio) maintain adequate velocity and advect the solids all the way to the primary separation element 11 without reversing direction. The material of the pipe riser support assembly is selected to resist corrosion. The pipe riser/support assembly is anchored at four symmetrically aligned locations to the stand 33 of FIG. 9. In anchoring the assembly, vertical and horizontal adjustment is easy with sliding the clamps and pipes horizontally along the strut for horizontal adjustment and sliding the pipes vertically within the clamps for vertical adjustment. The separation pan is quickly and easily removed by loosening the hydraulic unions just beneath the upper head compartment 32 of the separation pan 35.

The invention operates with both elevation head and velocity head. The fluid pressure generated by the pump is totally converted to velocity head as fluid escapes from the head compartment 32 to the coarse screen 11. The resultant velocity supports the shearing action of fluid on the wedge wire screen face. As remaining fluid proceeds down the face of the screen, elevation head is converted to velocity head, which further supports the shearing action of the fluid on the screen face. During conditions of relatively low flow to moderate flow, contribution from all three energy components drives the separation. For relatively high to extremely high flows, a deflector plate 50 on the upper head compartment cover directs flow down against the screen to enhance the separation of liquid from solid. The fluid energy is not increased by the deflector plate, rather, the deflector plate optimally orients the velocity energy component in a favorable direction to ultimately achieve greater wedge wire screen shearing capacity.

Downward along the wedge wire screen face, the fluid follows a profile of decreasing discharge through the screen pores until all the fluid has passed across the screen face. Typically, the fluid is removed from the solid across the first half of the screen length, leaving the second half for accumulation of solids. The biting/shearing action of the water against the wire edges over the first half of the screen length assists the passage of fluid, yet the same biting action undesirably inhibits the release of solids down the second half of the screen face resulting in solids accumulation at the shearing edges of the screen wires.

Figure 11:
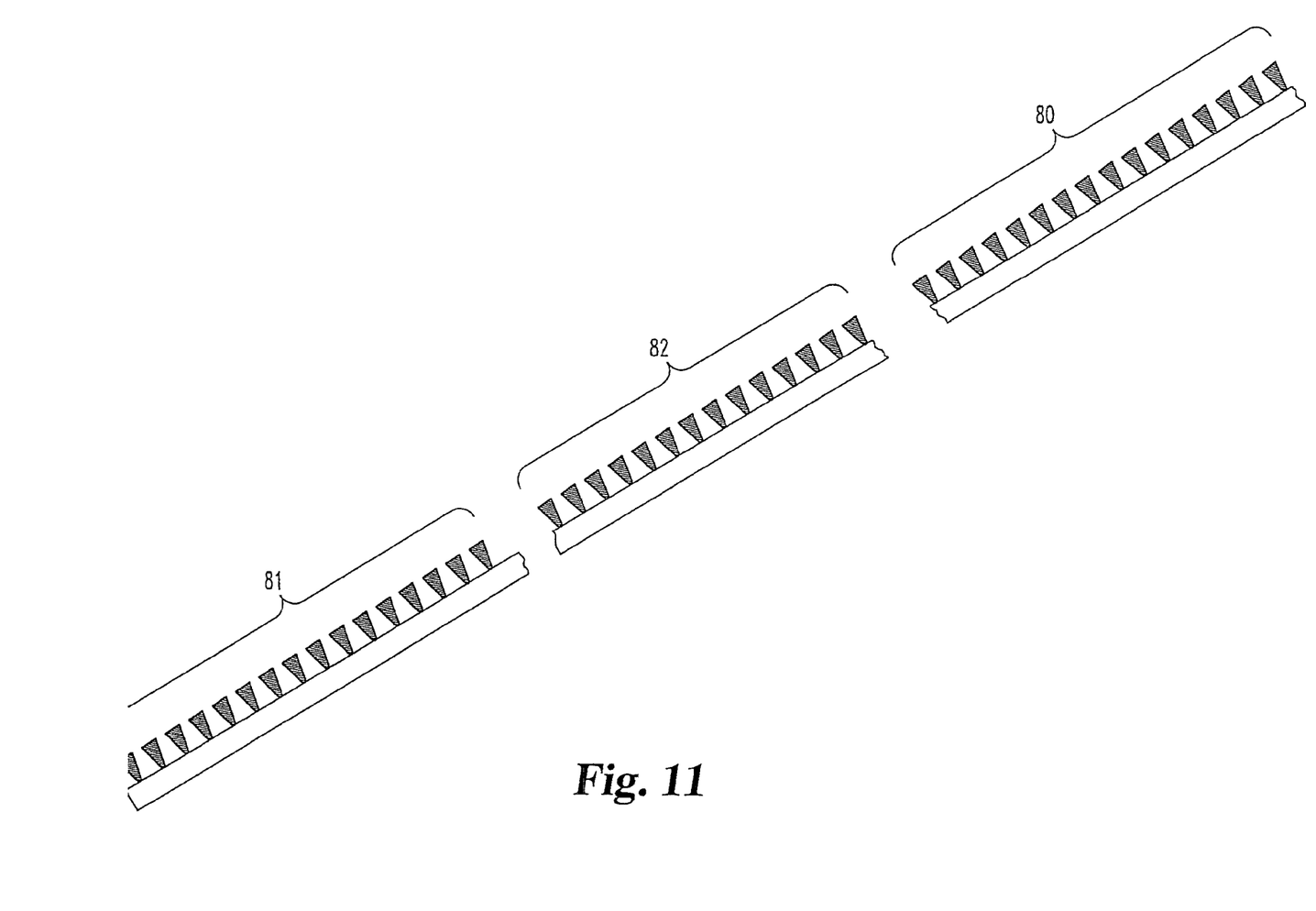
FIG. 11 is a view similar to FIG. 6 of an alternative embodiment.

FIG. 11 shows a new wedge wire screen design where the cant angle on the screen wires transitions in step-wise fashion from having high shear capacity at the upper region 80 of the screen to essentially none at the toe region 81 of the screen. In this way the fluid is removed at the beginning of the flow path where the screen wires have greater tilt angle, whereas near the toe of the wedge wire screen, the solids slide downward more readily with the screen wires forming a fairly low friction plane. In the illustrated example, there are three cant angles in the regions 80, 81 and 82. In this design, as another example, the length of wedge wire screen is divided into 6 fairly equal length regions, where each region has a set of wires with equal cant, 5-degree cant in the first region, 4-degree cant in the second, 3-degree cant in the third, 2-degree cant in the fourth, 1-degree cant in the fifth and 0-degree cant in the sixth. Also, another way of encouraging the solids to slide down the lower portion of the screen would be to transition wire spacing from relatively large opening at the top of the screen, decreasing to near zero at the toe of the screen.

The wedge wire screen is easily inserted within a slot of the upper screen support 61 (FIG. 10). The screen fits within the separation pan without fasteners. The screen is removed and replaced by hand for easing installation and maintenance with no specialty tools required. The screen is adapted at the toe with a plate 77 that forms a smooth transition off the last wedge wire to enhance the release and propulsion of solids from the wedge wire screen.

Fluid moves down the separation pan 35 to the lower portion of the separation pan where the magnets 16 attract ferromagnetic material. In one preferred embodiment, fluid filling the lower portion of the separation pan provides sufficient elevation head for a flow rate of approximately 35 gpm before the level in the lower separator pan overflows the upper edge of the lower screen support. The fluid continues predominately flowing through the coupling mounted on the underside of the lower separator pan and through valve 40. The fluid returns to the process tank 21 through the active return line 37.

The pump/screen rinse controller 25 initiates a screen rinse either automatically or by manual push button. Alternatively, a manually operated valve may be actuated to achieve the same screen rinsing effect. In any case, upon initiation of a screen rinse, sheet flow commences down the face of the screen which dislodges accumulated solids. As a consequence, liquid and solids slide down off the toe of the screen and continue down across the top of the lower screen support until falling vertically through the liquid/solid discharge chute 36 to the strainer basket 12. The strainer basket fits within the settling box 15. The lip 71 of the strainer basket fits flush and level on the top edges of the settling box to create pressure differential across the strainer basket for improved motive in driving fluid across the fine screen material of the strainer basket. Passive fluid flow returning to the process tank through line 41 creates slight negative pressure within the annular space between the strainer basket and the settling box when flow across the screen is temporarily and lightly obstructed. Under this condition, atmospheric pressure assists in driving the fluid across the fine screen to the low pressure region on the other side of the fine screen, leaving most of the solids within the basket. Most of the small fines that flow unimpeded through the basket screen will settle in the settling box or be attracted to magnet 17 within. Magnet 17, as well as 16, are held in place with spring clips (FIG. 10). The clips are located along the magnet to avoid interfering with the attracted ferromagnetic material when the magnet is removed for cleaning. Fluid flowing out of the settling box must achieve the level of settling box outlet. This drives the detention time required for settling. Periodically, the internal strainer basket is removed to dispose the accumulated solids within. A cam claw latch (not shown) on one side of the settling box is released, allowing the top of the strainer basket/settling box assembly to rotate away from the stand about the bottom hinge as shown in FIGS. 3 and 4. With the strainer basket/settling box assembly rotated away, the basket and magnets within are easily removed for maintenance.

If installed as an option, a proximity switch against the settling box automatically interrupts electrical power to the pump when the settling box is rotated away from the stand. In this way, an automatically programmed screen rinse cycle will not be initiated with the strainer basket/settling box rotated out of the way, thus preventing fluid and debris from discharging uncontained. A chain 55 (FIGS. 1, 3 and 4) limits the settling box rotation and is welded at one end to the side of the settling box and bolted at the other end to the stand. The chain is located on the opposite side of the settling box to which the cam claw latch is fastened thereby avoiding interference.

The strainer basket is hung from the top lip 71, thus allowing free space and increased settling volume directly beneath the bottom surface of the strainer basket. The internal strainer basket is removed by pulling up on the centrally located handle 85 near the top of the strainer basket. The inverted V-shape of the handle sheds fluid and solids that are discharged while providing structural integrity to the strainer basket. Removed from the settling box, the strainer basket is inverted and lightly tapped against a receptacle to remove and dispose of solids within. Spray water from a garden hose and pressurized air may also be used to rinse the basket and dislodge collected solids.

The inside bottom of the settling box will have fine sediments that are easily washed away by jetting action of a spray hose with the rinse line valve 56 open. The silt rinse line may feed a 5-gal. bucket or existing floor drainage. After cleaning, the strainer basket and magnet are replaced and the settling box/strainer basket assembly is lightly slammed shut and automatically retained by the cam claw latch. The passive return line 41 length is cut in slight excess to provide slack when rotating the settling box away from the stand. Alternatively, a coiling hose arrangement spiraling downward in the direction of passive return optimizes gravity return assistance.

In dumping a process tank 21, the fluid can be pumped through the apparatus and then drained directly to waste, instead of flowing back through the active return line. This will separate the solids from the liquid while draining the process tank. When the process tank is completely drained via the pump, the flow switch will sense a no-flow condition and turn off the recirculating pump. In releasing fluid from the process tank this way, the discharged wastewater is not unduly loaded with solids, thereby reducing downstream waste treatment costs. The controller may be equipped with a push-button that may be used for: 1) partial periodic process tank purging or, 2) full and complete process tank draining. With this releasing feature, the separator may be used for filtering to waste, whether fluid is purged or completely drained from the process tank. Partial periodic draining systems may be refreshed with make-up water on level control signals from the process tank.

The settling box fastens to the stand through solid strut with spring nuts. The strut/nut fastening system allows horizontal adjustability and removes the high tolerance hole mating required in conventional fastening systems. The settling box must be rotated away from the stand to remove or reinstall the strainer basket (as shown in FIG. 4).

The pump/screen rinse controller 25 provides ON/OFF control of the recirculating pump and ON/OFF control of the screen rinse function. The controller is enclosed in an electrical enclosure with adequate electrical rating. The pump is manually started by pushing a green push-button that illuminates when the pump is running. The pump is manually stopped by pushing a red push-button. The screen rinse function may be activated either manually or automatically on a time basis. The screen rinse function is selected by turning a selector switch to the ENABLE position. A screen rinse is initiated by momentarily pushing the blue push-button in. The blue light of the push button will illuminate during the screen rinse and not illuminate when the timed screen rinse terminates. The screen rinse is also on an automatic timer that will initiate at preset intervals. Both the frequency and duration of the screen rinse cycles are adjustable via timers located within the controller enclosure. Frequency and duration are determined by the hydraulic capacity of the strainer basket along with the desired filtration rate across the fine screen of the strainer basket. The pump will not run continuously if the flow switch does not sense flow, thereby preventing damage from running the pump dry. The flow sensor is equipped with an adjustable timer that turns the pump OFF after the preset time period to prevent damaging the pump in running dry for too long. Also, an optional proximity switch associated with the strainer basket/settling box will immediately prevent the pump from running, if the settling box is rotated away from the stand. Whether by low flow or by having the proximity switch tripped, the yellow NO-FLOW alarm light will illuminate. After correcting the tripping condition, the yellow light is pushed in to reset the system and then the pump may be turned on. When screen rinsing is not desired, the screen rinse selector switch is turned to the DISABLE position. A drain feature may be added to the controller that opens a second valve on a drain line. The drain turns off automatically after the tank is pumped dry and the recirculation pump turns off via the flow switch.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. One modification that might be made would be incorporating the invention as a part of a manufacturing line (or specific equipment within that line). In such an alternative, the controls would likely be a part of the manufacturing line. Another alternative embodiment might include the rinsing process above described but would not include a recirculation line.

What is claimed:

1. A process for separating solids from liquids comprising:
    providing a supply of a solid-containing liquid;
    providing a first screen arranged at an angle to the horizontal and having an upper end and a lower end;
    providing an active return line positioned below said first screen to receive liquid that flows through said first screen and return the liquid to the supply;
    conveying the solid-containing liquid from said supply to said first screen to filter the solid-containing liquid;
    controlling the flow through said active return line to rinse the first screen and cause solids thereon to move off the screen; and
    providing a magnet positioned adjacent to said lower end of said screen.

2. The process of claim 1 further comprising:
    providing a discharge chute at the lower end of said first screen for receiving and collecting liquid and solids that do not pass through said first screen; and
    providing a second screen that receives the liquid and solids exiting from said discharge chute.

3. The process of claim 2 wherein the second screen comprises a 100-micron filter.

4. The process of claim 1 further including: providing a pump suction line, providing a pump connected to said pump suction line and providing a pump discharge line leading from said pump to the upper end of said first screen for conveying said solid-containing liquid.

5. The process of claim 1 wherein the first screen comprises a 200-micron filter.

6. A process, as claimed in claim 1, further including:
    causing an increase in pressure in an area below the first screen thereby limiting flow through said first screen to cause an increase in flow of fluid on an upper surface of the first screen thereby causing the solids thereon to move off the screen.

* * * * *

UNITED STATES PATENT AND TRADEMARK OFFICE
CERTIFICATE OF CORRECTION

| | | |
|---|---|---|
| PATENT NO. | : 7,799,231 B2 | Page 1 of 1 |
| APPLICATION NO. | : 12/192680 | |
| DATED | : September 21, 2010 | |
| INVENTOR(S) | : William O. Irvine | |

It is certified that error appears in the above-identified patent and that said Letters Patent is hereby corrected as shown below:

Title Page, Item [60] Related Application Data should read
--(60) Continuation of application No. 11/624,790, filed on Jan. 19, 2007, now Pat. No. 7,455,784, which is a division of application No. 11/291,049, filed on Nov. 29, 2005, now Pat. No. 7,303,672, which is a continuation of application No. 10/412,899, filed on Apr. 14, 2003, now Pat. No. 6,986,849.--.

Signed and Sealed this
Fourth Day of January, 2011

David J. Kappos
*Director of the United States Patent and Trademark Office*